M. MAGINN.
FLEXIBLE CAR WHEEL.
APPLICATION FILED JULY 15, 1907. RENEWED NOV. 5, 1910.
982,217.
Patented Jan. 17, 1911.
2 SHEETS—SHEET 1.
FIG 3.
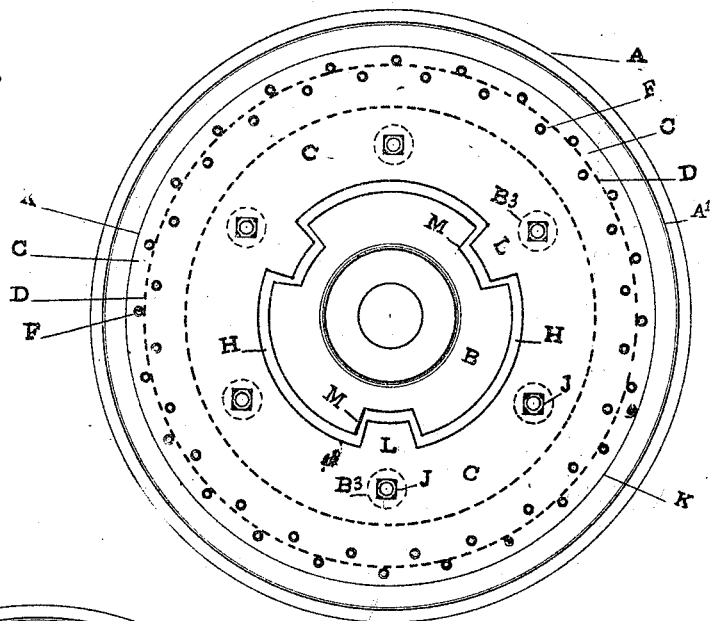
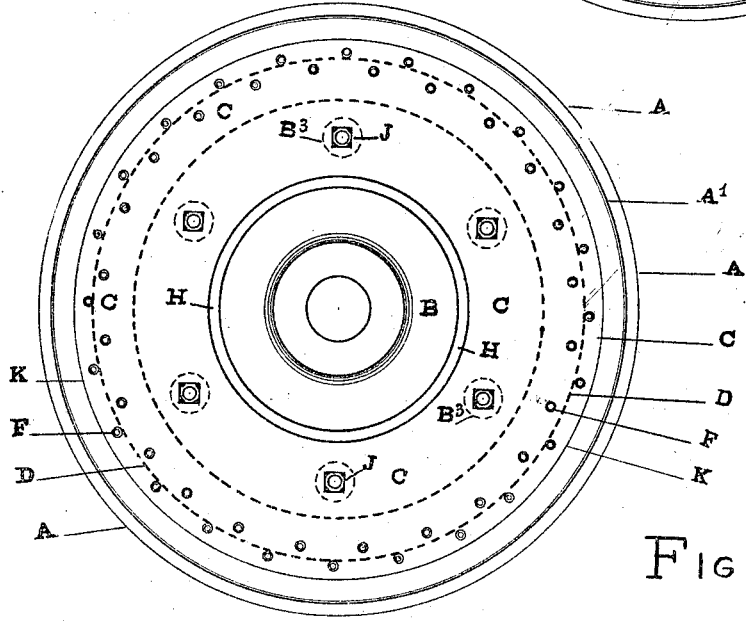
FIG 1
WITNESSES:
INVENTOR.
Madison Maginn M. MAGINN.
FLEXIBLE CAR WHEEL.
APPLICATION FILED JULY 15, 1907. RENEWED NOV. 5, 1910.
982,217.
Patented Jan. 17, 1911.
2 SHEETS—SHEET 2.
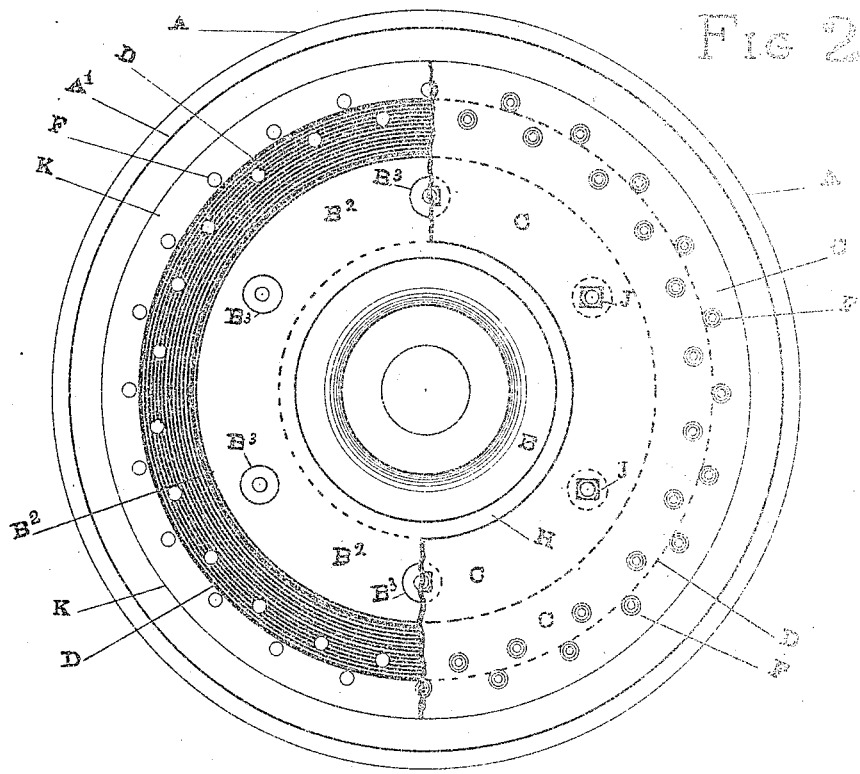
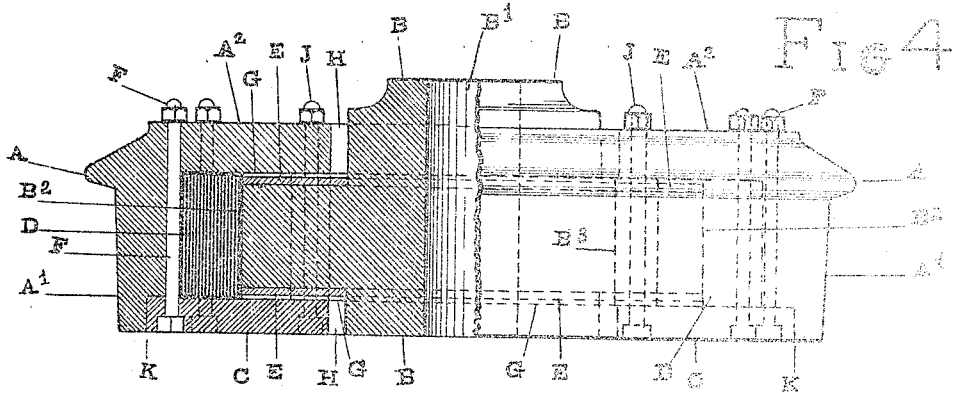
WITNESSES:
INVENTOR.

UNITED STATES PATENT OFFICE.

MADISON MAGINN, OF CHICAGO, ILLINOIS.

FLEXIBLE CAR-WHEEL.

982,217.  Specification of Letters Patent.  Patented Jan. 17, 1911.

Application filed July 15, 1907, Serial No. 383,885. Renewed November 5, 1910. Serial No. 590,880.

*To all whom it may concern:*

Be it known that I, MADISON MAGINN, a citizen of the United States, residing at Chicago, in the county of Cook and State of Illinois, have invented a new and useful Flexible Car-Wheel, of which the following is a specification.

My invention relates to traction wheels employed in the support and transportation of railway cars, and the like, and is applicable to steam, electric, street or other cars in which car wheels are used. This wheel is built up in sections, and these sections are secured together by bolts or rivets, for the purposes of constructing a flexible car wheel. And the objects of my improvements are: first; to provide ways and means in a flexible car wheel, so that when such wheels strike any uneven obstructions of or upon the rails of a railway track, such jolt or blows will be partly or entirely taken up by the flexible car wheel. Second; to provide ways and means in flexible car wheels, that when applied to the truck of a railway car, such car will ride smoothly over the railway track. Third; to provide ways and means in a flexible car wheel, that such wheels will prevent the noise now attendant to railway cars by the constant jolting over the rail joints, switches, and railway crossings. Fourth; to provide ways and means in a flexible car wheel, and its application to car trucks, that the said flexible car wheels receive the jar or blow first, and reduce said blow and jar to a minimum, before reaching the journal boxes of the truck, thus saving the bearing brasses from the ordinary heavy blows that they now receive and have to sustain, and relieve the wear on the road-bed, rails, bridges, etc., as well as the rolling stock, all at one and the same time. Fifth; to provide ways and means in a flexible car wheel, for producing a solid like car wheel, when the flexible material of the wheel becomes overloaded. I attain these objects by the mechanism and means employed and illustrated in the accompanying drawings, in which;

Figure 1. is a plan view of the face of a flexible car wheel. Fig. 2. is a plan view, part sectional, of the face of a flexible car wheel. Fig. 3. is a plan view of the face of a flexible car wheel, illustrating a modification of a driving flexible car wheel for motor cars. Fig. 4. is an edge view, part sectional, of a flexible car wheel.

Similar letters refer to similar parts throughout the several views.

In the drawings the letter A, represents the rail flange portion of the car wheel; $A^1$, is the tread, or that portion of a car wheel that rests or rolls upon the top surface of a railway rail; $A^2$, is a lower side interior extending flange, which is also a part of the flange A, and the tread $A^1$; in other words, A, $A^1$, and $A^2$, in this construction, is preferably all in one piece.

B, represents the hub portion of the car wheel, and is provided with a bore $B^1$, for its attachment to the car axle; this hub portion is made with an annular extension $B^2$, encircling the entire hub, as shown in all the figures in the drawings; this extension $B^2$, is also provided with openings $B^3$, passing all the way through the hub extension, and its functions will be explained further on.

The letter C, represents a follower plate, which is secured to the flange portion A, $A^1$, $A^2$, by bolts F, or rivets, as desired. The letter D, represents a ring of flexible material, of any suitable character for this purpose. I have illustrated a specially prepared rubber and fibrous material for this construction; as the space prepared in this design is quite large, for some purposes, springs may be employed, in lieu of other material having flexible qualities. And for some requirements this space D, may be filled with asphalt; a construction having the parts enumerated, all adapted and put together as illustrated and described, will perform every function of a flexible car wheel.

When it is required or necessary to construct a flexible car wheel, that in addition will be noiseless, I prepare a ring E, of vulcanized asbestos, or straw board, or any non-sound conducting material, and shape it to fit the sides of the extension part of the hub $B^2$, and place a ring of this material upon both sides of the extension $B^2$, as shown in section, Fig. 4, at E—E. To prevent the wearing away of the vulcanized asbestos, or the non-sound conducting material, by the flexible movement of the outer portion of the wheel, I provide a thin sheet steel wearing plate G, and shape it to cover the outer surface of the vulcanized asbestos, and place this wearing plate G, over the vulcanized asbestos, and next to the follower plate C, on one side, and next to the extension flange A², upon the other side, as shown in section Fig. 4. (See both sides of hub extension B², at G G.)

Having described the several parts of its construction, and the placing together of these several parts, its *modus operandi* is as follows: Take the flanged portion A, A¹, A², after boring and turning its several surfaces as desired, then place it upon a suitable frame or table, with the flange side A², against said frame, thus leaving the largest opening uppermost; next prepare the hub portion B, as shown in section Fig. 4, and place this within the center of the opening of the flanged portion A, A¹, A²; after placing the part B, as shown in Figs. 2, and 4, next prepare a ring of flexible material, D, and place this in the prepared opening between the outer edge of the hub extension B², and the inner wall surface of the outer flange portion A, as shown in section Fig. 4, edge view in Fig. 2, and by dotted lines D, in Figs. 1, and 3. Now having placed in the flexible part D, as required, next prepare a follower plate C, bored and faced off smooth upon the inside and both edges, as shown in Figs. 1, 2, 3, and 4, at K; place this plate in its position as shown and secure the same by the bolts or rivets F, after which place in the stay and compression bolts J, and the flexible car wheel is complete. Having pressed the wheel upon the axle in the usual manner, it will be readily noticeable that any weight or load which may be brought to bear upon the axle of the wheel, will be first transferred to and upon the flexible material D, and thence through this medium to the flanged portion of the wheel A; in carrying this load along upon the rails of a railway track, when the car wheels are in motion, any uneven obstruction the wheels may have to pass over, causes a movement which is reversed to the above results described as coming from the load upon the axle; in the case in transit, the uneven obstruction to the wheels in passing over, is first taken up by the flanged portion and transferred to the flexible material, which in ordinary cases will not affect the equilibrium of the load or car to which it may be attached. In the more extreme cases, the flexible material in the wheel will take off the first shock or blow given to the wheel, and greatly reduce its force before reaching the hub, or the axle, with its brasses, and journal bearings, springs etc. It will be noticed that the flexible movement of the flange portion with the hub portion of the flexible wheel, is limited to the size of the circular opening H, between the flange extensions and hub portions, as shown in all of the drawings. The space formed by the annular opening H, provides for the movement axially, of the rim portion with the hub portion of my wheel. The annular shoulders formed upon the hub portion as shown in Fig. 4, at H, and the annular internal rim shoulder formed upon the follower plate at its center opening, located upon one side of the wheel, and a like annular shoulder formed upon the center opening of the interior extension flange of the tread portion of my wheel, located upon the other side of the wheel, are so constructed and arranged with reference to each other, as to form the means for producing the result of a solid like wheel of a flexible wheel, whenever in its operation the flexibility of the flexible material within the wheel becomes overloaded. This arrangement of devices also provides the means for preventing any excess load upon the wheel, from destroying or injuring the flexible material; as under extreme conditions the metal of the rim portion comes in contact direct with the metal of the hub portion at H, and stops any further movement axially, of the rim portion with the hub portion. It will also be noticed that the stay and compression bolts J, which moves with the flange A, by means of the wheels in transit coming in contact with obstructions upon the rails, must move independent of the hub portion; this is provided for, by having holes B³, through the hub extension B², in which the bolts pass through, large enough in diameter, so that in no case can the movement be great enough to cause the bolts J, to strike the metal in the extension B².

In order to adapt this wheel to drive a motor car of an electric road, I have shown in Fig. 3, a modification of the devices employed, to meet this requirement by making depressions M, in the hub portion of the wheel, and corresponding extensions L, upon the follower plate, and the extension flange A², upon the other side of the wheel, so that they will operate like the teeth of a gear wheel, in so far as the meshing operation is required, but prevents entirely the possibility of the flanged portion rotating without the hub portion following in the unison required.

I am aware that prior to my invention flexible wheels were made and employed for the common road vehicle; but I am not aware that the combination for a flexible car wheel, such as I have brought out by actual experiments, as designed and set forth in the annexed drawings and specifications, has ever before reached such a state of perfection as I have combined in my invention.

Having described forms for its construction, and explained the nature of my invention, and the manner of using the same, what I claim and desire to secure by Letters Patent is:

1. In a flexible car wheel, the combination, of a central hub portion, and an outer rim portion, arranged with an annular recess or opening between said hub portion and said rim portion, flexible material, arranged in said annular recess, non-sound conducting material, arranged upon the sides of the flexible car wheel, substantially as and for the purposes specified.

2. In a flexible car wheel, the combination, of a hub section, and a rim section, flexible material, interposed between said sections, non-sound conducting material, flexible or otherwise, arranged about the sides of the wheel, wearing plates, protecting the non-sound conducting material, substantially as and for the purposes specified.

3. In a flexible car wheel, the combination, of a hub section, and a rim section, flexible material, interposed between said sections, a side or flange extension of the rim section, arranged for operative contact with the hub section, for limiting the movement of the rim section, with the hub section, substantially as and for the purposes specified.

4. In a flexible car wheel, the combination, of a hub section, and a rim section, flexible material interposed between said sections, nonsound conducting material, arranged upon the sides of the wheel, devices formed upon the hub section, for driving and operating the rim section, in unison with the hub section, independent of the flexible material, substantially as and for the purposes specified.

5. In a flexible car wheel, the combination, of a hub section, and a rim section, flexible material interposed between said sections, a follower plate, provided with a contact bearing surface, engaging with the hub section, for supporting the outer rim section, when any excess load or strain is applied to the wheel, forming a solid like wheel under these conditions, substantially as and for the purposes specified.

6. In a flexible car wheel, the combination, of a hub section, and a rim section, flexible material interposed between said sections, non-sound conducting material, arranged upon the sides of the wheel, as a muffler, and for preventing the noise made by the rim section, in operative contact with the rail, from being transferred to the hub section, or the body of the car, substantially as and for the purposes specified.

7. In a flexible car wheel, the combination, of a hub section, and a rim section, flexible material interposed between said sections, non-sound conducting material, arranged upon the sides of the hub section, wearing plates, arranged to protect the non-sound conducting material, and means for securing the plates and wheel together, substantially as and for the purposes specified.

8. In a flexible and noiseless car wheel, the combination, of a hub, and an annular extension formed thereon, a rim, having a side interior extending flange, attached to the tread and rail flange, a follower plate, removably arranged, with said rim, flexible material, interposed between said annular hub extension and the rim, non-sound conducting material, interposed between the sides of the annular hub extension, and the projecting flanges of the rim, as a muffler, and for preventing noise from traversing from one section of the wheel to the other section, substantially as and for the purposes specified.

9. In a noiseless flexible car wheel, the combination, of a hub, arranged with an annular extension thereon, a rim, arranged with a side interior extending flange, attached to the tread and rail flange, a follower plate, arranged in contact with both hub and rim sections, flexible material, interposed between the annular hub extension and the tread rim, non-sound conducting material, interposed between the sides of the hub portion and the rim portion, for the purpose of muffling the noise, and to prevent vibration of the metal in the composition of the wheel, substantially as and for the purposes specified.

MADISON MAGINN.

Witnesses:
 Wm. E. Kyle,
 J. E. Shakespeare.